Figure 1:
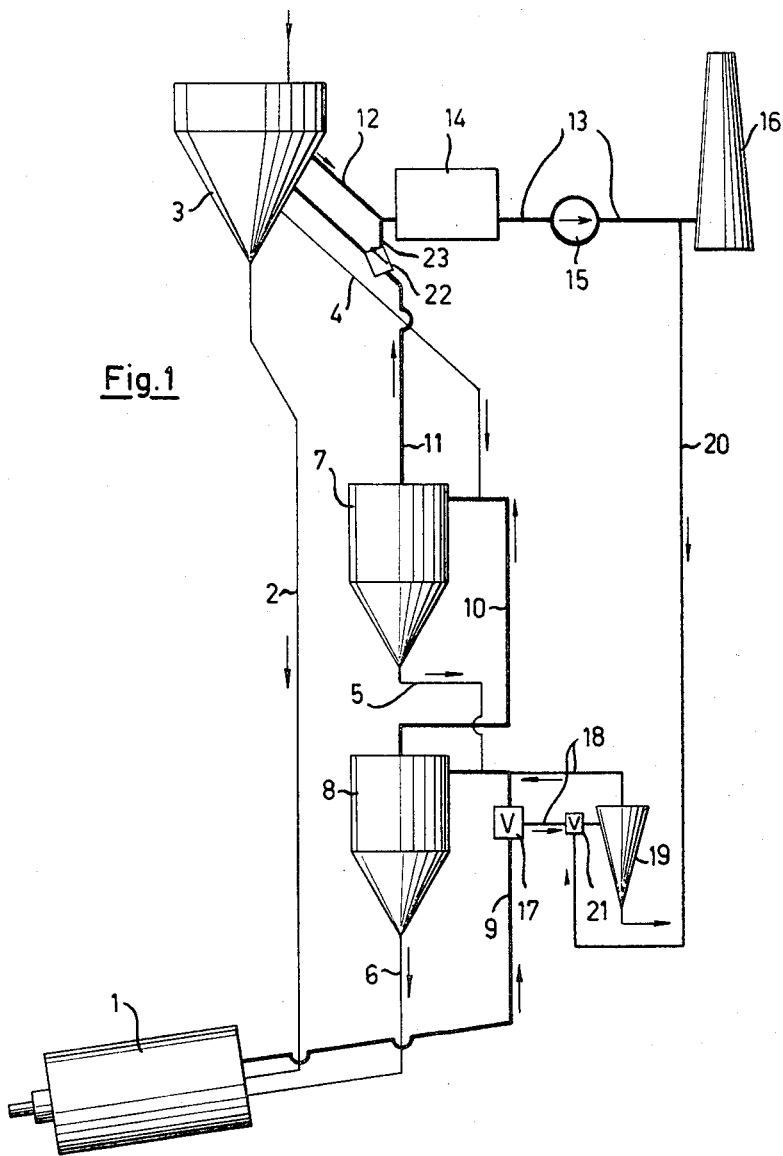

May 28, 1968

R. RUEGG 3,385,580

HEAT TRANSFER FROM WASTE GAS OF A CEMENT KILN
TO PULVERULENT RAW MATERIAL

Original Filed Aug. 14, 1964

2 Sheets-Sheet 1

INVENTOR.
RUDOLF RUEGG

BY
Dodge and Sons

ATTORNEYS

United States Patent Office 3,385,580
Patented May 28, 1968

3,385,580
HEAT TRANSFER FROM WASTE GAS OF A
CEMENT KILN TO PULVERULENT RAW
MATERIAL
Rudolf Ruegg, Zurich, Switzerland, assignor to Escher
Wyss Aktiengesellschaft, Zurich, Switzerland, a corporation of Switzerland
Continuation of application Ser. No. 389,668, Aug. 14,
1964. This application Mar. 14, 1967, Ser. No. 623,138
Claims priority, application Switzerland, Nov. 4, 1963,
13,503
11 Claims. (Cl. 263—32)

This is a continuation of application Ser. No. 389,668 filed Aug. 14, 1967, now abandoned.

This invention relates to a process for the heat transfer from a waste gas stream issuing from a cement kiln, to pulverulent raw material to be supplied to the cement kiln, and to an apparatus for carrying out said process.

It is known to pre-heat pulverulent raw material in open heat exchange by the waste gases of a rotary kiln. In a known apparatus, the waste gases flow in cross current through the granulated raw material charged onto a travelling grate, which involves a high heat consumption and considerable equipment outlay. It is furthermore known to admix raw material with waste gases, preferably in one or more cyclones connected in series, and to separate them again. In such plants, clogging of heat-exchangers and conduits carrying material readily occurs in consequence of caking and incrustation of raw material, and this leads to irregularities and trouble in operating the plant.

It is the aim of this invention to overcome these drawbacks. For this purpose, a process of the kind hereinbefore described is carried out according to the invention by dividing the raw material stream into a coarse fraction and a fine fraction and then allowing of the two subdivided streams, only the coarse fraction to participate in the heat exchange, the heat exchange between the waste gases and the material being effected in one or more zones of the gas stream.

The invention is based on the knowledge that predominantly the fine fractions of the raw material clog in the heat-exchangers and conduits. The tendency of the raw material to clog increases with its alkali content, since the alkali vapours coming from the rotary kiln are preferably deposited on the fine fractions and the latter thereby become sticky. The chlorine content of the fuel leads to the formation of alkali chlorides, which additionally promote clogging.

In carrying out the process according to the invention of dividing the raw material into its fine fraction and coarse fraction and of allowing the latter only to participate in the heat exchange, it is sufficient to separate out approximately 10 to 20 percent of the total raw material as fine fraction to prevent the occurrence of appreciable clogging with the coarse fraction thus remaining. The fine fraction separated out to said extent has such a high heat transfer coefficient in consequence of the ratio of surface to volume that its introduction into the rotary kiln in the cold state does not substantially effect the combustion process. If necessary, the still undivided raw material may also take part in the heat exchange in a comparatively short action, in which the fine fractions are adequately heated. The subdivision into the fine fraction, passing directly to the rotary kiln, and into coarse fraction, participating in the heat exchange, occurs in this case in a region, in which the raw material stream has already absorbed heat from the waste gases.

A further step according to the invention for preventing clogging may comprise removing from the waste gases the alkali vapours coming from the rotary kiln. This step, at the same time, prevents the continuous concentration in alkali content which occurs in the plant in consequence of the open heat exchange, and which has a detrimental effect on the combustion process and the quality of the produced cement clinker. Since, for given raw material and given fuel, a number of alkali compounds having different precipitation temperatures are produced, the separation of the very fine dust contained in the waste-gas stream and on which the alkali vapours are condensed will be carried out in suitable temperature ranges of the heat-exchange section, and in this way all the alkali compounds will be covered, thereby affording the further advantage that high-alkali dust is obtained separately from low-alkali dust, which is separated in the final dust arrester, usually necessary in any event for keeping the air clean, and at all events in other temperature ranges. The heat-exchange zones are so designed that the waste-gas stream flowing separately from the material has at one or more points the temperature necessary for the condensation of the alkali vapours.

Figure 2:
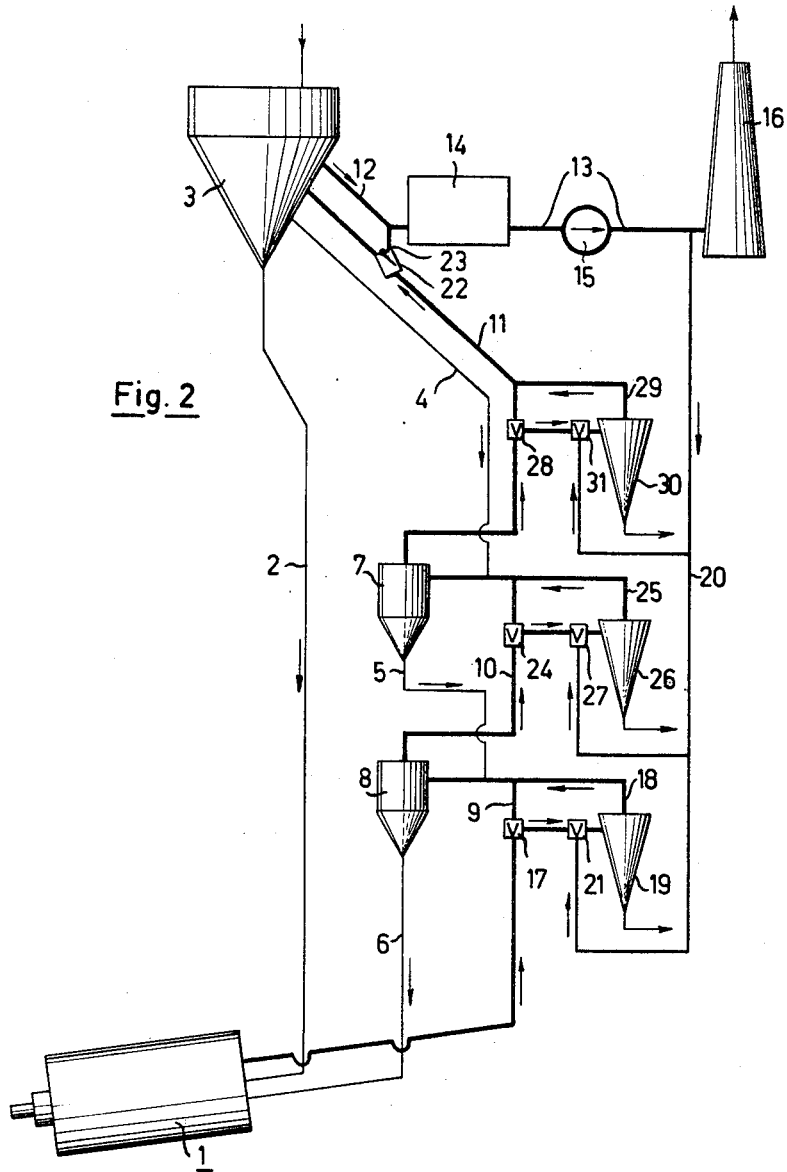

Constructional examples of apparatus for carrying out the process according to the invention are represented in simplified form in the accompanying drawings, with reference to which the process will be explained. In these drawings:

FIG. 1 shows a diagram of a plant for pre-heating raw cement flour by the waste gases of a rotary kiln, and FIG. 2 is a diagram of a plant of another embodiment, corresponding parts having the same references.

The plant shown in FIG. 1 has a rotary kiln 1 of known type, into which opens a fine-fraction conduit 2, coming from the fine-fraction discharge connection of a classifier 3 of the cyclone type. The classifier 3 may be one of the type, through which flows an additional gas stream, the material to be classified being in open heat exchange with the additional gas. The coarse fraction discharge connection of the classifier 3 is connected by a coarse fraction pipe having sections 4, 5, 6 to the rotary kiln 1, cyclones 7, 8 being connected in series in the coarse fraction pipe having the sections 4, 5, 6, and a waste-gas pipe, having the sections 9, 10, 11 leading from the rotary kiln 1 to the additional gas inlet connection of the classifier 3, each of said cyclones 8, 7 having a common inlet connection for receiving the incoming coarse fraction of the raw material and the waste-gas stream, while the raw material and the waste gas are discharged through separate connections. Leading from the additional gas discharge connection of the classifier 3 is a waste-gas pipe having sections 12, 13, in which are inserted a final dust arrester 14 and an air exhauster 15 at the foot of a chimney 16.

Connected in the section 9 of the waste-gas pipe is a distributing valve 17, from which a bypass pipe 18 branches, a multicyclone 19 being connected in said bypass pipe 18. Distributing valve 17, bypass pipe 18 and multicyclone 19 may be so dimensioned that the quantity of waste gas coming from the rotary kiln 1, about 25 percent can be passed through the multicyclone 19 instead of direct to the cyclone 8. Branching from the chimney-side part of the section 13 of the waste-gas pipe is a cold gas pipe 20, leading to a mixing valve 21 inserted in the part of the bypass pipe 18 situated between the distributing valve 17 and the inlet connection of the multicyclone 19. Built into section 11 of the waste-gas pipe is a change-over valve 22, the branch connection of which opens through a bypass pipe 23 into the section 12 of the waste-gas pipe.

The plant operates as follows. The raw material is introduced into the classifier 3, where it is divided into a fine fraction and a coarse fraction, the fine fraction conveniently amounting to from 10 to 20 percent of the total quantity of coarse material. The fine fraction passes through the fine fraction pipe 2 into the rotary kiln 1, and the coarse fraction passes through the coarse fraction pipe with the sections 4, 5, 6 into the rotary kiln 1. An open heat exchange takes place in two zones comprising the cyclones 7, 8, respectively, which are inserted in the coarse fraction pipe and through which the waste gases from the rotary kiln 1 flow at the same time. In the position of the change-over valve 22 shown in the drawing, the waste gases from the cyclone 7 enter a further heat exchange zone which comprises the classifier 3, where an open heat exchange occurs between raw material and waste gases. The waste gases leave the classifier 3 via section 12 of the waste-gas pipe, are purified in the final dust arrester 14 and are blown into the chimney 10 through section 13 of the waste-gas pipe by the air exhauster 15. Thus, no fine fraction which would adhere fast on the walls of the material pipes and cyclones enters the heat-exchange zones comprising the cyclones 7, 8, but after a slight heat exchange, which however is sufficient in view of their high coefficient of heat transfer, the fine fraction of the raw material bypasses the cyclones 7 and 8 and enters directly the rotary kiln 1. Only the coarse fraction, which is much less prone to clogging the parts of the plant through which it flows, passes through the heat-exchange zone comprising the cyclones 7, 8, in which heat exchange between waste gases and material principally takes place.

If there is a danger of clogging the classifier 3 by the fine fraction heated by the waste gases, then by throwing over the change-over valve 22 to the position not shown in the drawing, the waste gas stream could bypass the classifier 3 and pass directly to the final dust arrester 14.

With the described process it is thus possible to avoid clogging due to caking and incrustration of material, and the working reliability and service period of the plant can be considerably improved.

The waste gases from the rotary kiln 1 contain very fine dust and alkali vapours. By means of the distributing valve 17 at least approximately 75 percent of the quantity of waste gas produced at any time can be passed directly to the cyclone 8, and at the most approximately 25 percent can be passed previously through the multicyclone 19, where the very fine dust, with the alkalis precipitated on it, is separated from the partial stream of the waste gases, it being possible by adding comparatively cold waste gases from pipe 20, by means of the mixing valve 21, to the waste-gas partial stream in the bypass pipe 18, to ensure that the waste-gas partial stream has the optimum temperature for precipitation of the alkalis. The chlorine-containing alkali compounds promoting clogging of heat-exchangers and pipes carrying material to a very particular extent are preferably precipitated at the high temperatures prevailing in the waste gas passage between the rotary kiln 1 and the first heat exchange zone comprising cyclone 8, so that the precipitation of these alkali compounds alone substantially improves the working reliability and service period of the plant. According to experienece, removal of the high-alkali dust from approximately 25 percent of the waste gas stream in the case of high-chlorine alkali compounds and from approximately 10 percent of the waste gas stream in the case of low-chlorine alkali compounds is sufficient to ensure trouble-free operation during a long service period.

The plant shown in FIG. 2 affords a further improvement. In addition to the parts provided in the plant shown in FIG. 1, distributing valves 24, 28 are also inserted in the sections 10, 11 of the waste-gas pipe situated between the heat exchange zones comprising the cyclones 8 and 7, respectively, and between the heat exchange zone comprising the cyclone 7 and the heat exchange zone comprising the classifier 3. Branching off the said distributing valves are bypass pipes 25, 29, in which are inserted multicyclones 26, 30, mixing valves 27, 31, connected to the cold gas conduit 20, being connected in the parts of the bypass pipes 25, 29 situated between the distributing valves 24, 28 and the inlet connections of the multicyclones 26, 30, and the distributing valves 17, 24, 28 being so dimensioned that the entire waste gas quantity can be passed through each multicyclone 19, 26, 30.

The plant shown is based on the assumption that the alkali vapours from the rotary kiln are precipitated substantially in three, not too wide temperature ranges. Suitable dimensioning of the heat-exchange zones ensures that the waste gas stream flowing separately from the stream of material in sections 9, 10, 11 of the waste-gas flow passage has substantially the temperature necessary for precipitaion of the alkali vapours, it being possible to carry out fine correction by means of the mixing valves 21, 27, 31 in the manner described.

Even when practically all the very fine dust coming from the rotary kiln 1 with the waste gases is separated from the waste gas stream by the multicyclone 19, and practically dust-free waste gases enter the cyclone 8, very fine dust is again produced in the cyclone 8 from the coarse fractions, so that very fine dust is again present in the waste gases passing from the cyclone 8 to section 10 of the waste-gas pipe.

At the temperatures prevailing in this section 10 of the waste gas flow passage, alkalis are precipitated on the said very fine dust, and the very fine high-alkali dust is separated from the waste-gas stream in multicyclone 26. In the same way, the waste gases leaving cyclone 7 contain very fine dust, on which are precipitated the alkalis which are condensable at the temperatures prevailing in this section 11 of the waste-gas flow passage.

With the use of raw material and/or fuel producing alkalis which are precipitated only on two or one temperature range, one or two multicyclones may be bypassed, or however the low-alkali dust separated by them may be re-supplied to the kiln. It is also possible to allow only part of the waste-gas stream to flow through one or more multicyclones. Likewise, the multicyclones 19, 26, 30 could be so dimensioned that only part of of the waste-gas stream can be passed through them.

When using raw material and/or fuel other than those on which the dimensioning of the heat-exchange zones has been based, there may be shifting of the temperature ranges, so that the temperatures, at which the alkali vapours are precipitated, are outside the sections 9, 10, 11 of the waste-gas flow passage and inside the heat exchange zones comprising the cyclones 8 and 7 and the classifier 3. If the temperature-range shifts are uniform, the necessary correction can be made by varying the ratio of the charged raw material quantity to the fuel fired. In the case of non-uniform and/or only partial shift of the temperature ranges, by varying the ratio of the raw material to fuel, a range advantageously the hottest, is brought into the corresponding section of the waste-gas flow passage and the position of the other ranges is corrected by the addition of cold gas. During operation of the plant, the position of the temperature ranges within the plant can be adjusted by continuous supervision of the alkali content of the very fine dust separated by the multicyclones 19, 26, 30.

The described steps permit separation from the waste gases of a large part of the alkali compounds produced, and prevent concentration of the alkali content in the plant. A further advantage is that very fine high-alkali dust is produced separately from very fine low-alkali dust.

I claim:

1. A process for the transfer of heat from the hot waste gases issuing from a cement kiln to the pulverulent raw material being supplied to said kiln comprising
    (a) passing the raw material through a classifier and separating the raw material into a coarse fraction and a fine fraction;
    (b) forming a flowing stream from said waste gases;

(c) entraining the separated coarse fraction in said stream so that the coarse fraction is heated thereby;

(d) separating the entrained heated coarse fraction from said stream;

(e) preventing heat exchange between said separated fine fraction and said stream; and (f) supplying the heated coarse fraction and the fine fraction to said kiln.

2. The process defined in claim 1 in which the pulverulent raw material is also brought into heat exchange contact with waste gas issuing from the cement kiln before the separation of said fine fraction.

3. The process defined in claim 1 in which at least part of the waste gas stream, after its separation from the heated coarse raw material, is brought in heat exchange contact with the raw material before the separation of the fine fraction.

4. In the process defined in claim 1 separating fine dust particles, which may be present in the waste gas stream, from at least a portion of said waste gas stream and in a temperature range in which alkali vapors occurring in said portion of said waste gas stream may condense on said fine particles, said fine dust separation being accomplished before said entrainment of the coarse fraction in said waste gas stream.

5. An arrangement for the heat transfer from a waste gas stream issuing from a cement kiln to pulverulent raw material to be supplied to said cement kiln, comprising a classifier for the separation of a fine fraction of said raw material from a remaining coarse fraction of the raw material, said classifier having a supply connection for unheated raw material and two discharge connections, one for the supply of said separated fine fraction to the cement kiln and the other for the discharge of the remaining coarse fraction of the raw material; means defining a flow passage for said waste gas stream, including at least one heat exchange zone having an inlet for the coarse fraction to be entrained in the waste gas stream and a cyclone at its outlet for separating the entrained coarse fraction from the waste gas stream; and means for leading the coarse raw material fraction discharging from said cyclone to the cement kiln.

6. The arrangement defined in claim 5 in which said waste gas flow passage includes at least two serially arranged heat exchange zones, each having a coarse material inlet for entraining said coarse material with the waste gas and a cyclone for separating said entrained coarse waterial from the gas, and in which means are provided for serially leading the coarse raw material fraction through said heat exchange zones.

7. The arrangement defined in claim 5 in which the flow passage of the waste gas stream opens into the classifier so as to admix at least part of the waste gas leaving said heat exchange zone with the raw material supplied to the classifier before the separation of the fine fraction.

8. The arrangement defined in claim 5 in which means are provided for separating fine dust from at least part of the waste gas stream in at least one point of the waste gas flow passage situated outside said heat exchange zone.

9. The arrangement defined in claim 8 in which adjustable cold gas supply means are provided in advance of the fine dust separating means.

10. An arrangement for the transfer of heat from a waste gas stream issuing from a cement kiln, to pulverulent raw material consisting of a coarse fraction and a fine fraction, to be supplied to said cement kiln, comprising means defining a flow passage for said waste gas stream including serially arranged heat exchange zones; means for leading the coarse fraction raw material serially through each of said heat exchange zones of the gas flow passage before its being supplied to the cement kiln, the material being introduced into the gas stream at the upstream end of each heat exchange zone; means separating the coarse fraction from the gas at the downstream end of each respective zone; and means causing the fine fraction of the raw material to bypass at least the heat exchange zone which is the first in the direction of flow of the waste gas.

11. The arrangement defined in claim 10 which comprises fine dust separating means in said gas flow passage in at least one point situated between said heat exchange zones.

References Cited

UNITED STATES PATENTS

| 2,590,090 | 3/1952 | De Vaney | 263—32 |
|---|---|---|---|
| 2,785,886 | 3/1957 | Muller | 263 32 |
| 3,212,764 | 10/1965 | Muller et al. | 263—32 |

FREDERICK L. MATTESON, JR., *Primary Examiner.*

JOHN J. CAMBY, CHARLES J. MYHRE,
*Examiners.*